(12) United States Patent
Meek et al.

(10) Patent No.: US 7,329,049 B2
(45) Date of Patent: Feb. 12, 2008

(54) SPLICE CONNECTOR FOR VERIFYING AN ACCEPTABLE SPLICE TERMINATION

(75) Inventors: David W. Meek, Ft. Worth, TX (US); Scott E. Semmler, Keller, TX (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 11/318,814

(22) Filed: Dec. 27, 2005

(65) Prior Publication Data

US 2007/0147741 A1 Jun. 28, 2007

(51) Int. Cl.
G02B 6/38 (2006.01)

(52) U.S. Cl. .................. 385/55; 385/95; 385/96; 385/134

(58) Field of Classification Search .............. 385/77, 385/78, 81, 95, 134, 135, 137, 139
See application file for complete search history.

(56) References Cited

U.S. PATENT DOCUMENTS

| | | | |
|---|---|---|---|
| 4,030,809 A | 6/1977 | Onishi et al. | 350/96 C |
| 4,257,674 A | 3/1981 | Griffin et al. | 350/96.21 |
| 4,755,018 A | 7/1988 | Heng et al. | 350/96.21 |
| 4,877,303 A | 10/1989 | Caldwell et al. | 350/96.21 |
| 4,923,274 A | 5/1990 | Dean | 350/96.21 |
| 4,964,688 A | 10/1990 | Caldwell et al. | 350/96.2 |
| 5,040,867 A | 8/1991 | de Jong et al. | 385/60 |
| 5,259,047 A | 11/1993 | Morrison et al. | 385/27 |
| 5,261,020 A | 11/1993 | de Jong et al. | 385/76 |
| 5,394,496 A | 2/1995 | Caldwell et al. | 385/70 |
| 5,963,692 A | 10/1999 | Marazzi et al. | 385/80 |
| 6,173,097 B1 | 1/2001 | Throckmorton et al. | 385/59 |
| 6,379,054 B2 | 4/2002 | Throckmorton et al. | 385/66 |
| 6,439,780 B1 | 8/2002 | Mudd et al. | 385/83 |
| 6,442,318 B1 | 8/2002 | Goldman | 385/114 |
| 6,816,661 B1 * | 11/2004 | Barnes et al. | 385/134 |
| 6,931,193 B2 | 8/2005 | Barnes et al. | 385/134 |
| 2005/0238292 A1 * | 10/2005 | Barnes et al. | 385/78 |

OTHER PUBLICATIONS

Siecor® CAMLITE™ Multimode Connector Procedure for Laser Usage, SRP-006-046, CIRCA 1991, 2 pages.
Siecor® CAMLITE™ Connector Laser Assembly Aid Instructions, SRP-006-048, Issue 3, Sep. 1991, 6 pages.

* cited by examiner

*Primary Examiner*—Frank G. Font
*Assistant Examiner*—Hung Lam
(74) *Attorney, Agent, or Firm*—Keith A. Roberson

(57) ABSTRACT

A splice connector for verifying an acceptable splice termination includes a ferrule having a stub optical fiber, a ferrule holder for receiving the ferrule, opposed splice components within the ferrule holder for receiving and aligning the stub optical fiber and a field optical fiber, a cam member for engaging one of the splice components to terminate the field optical fiber, and means for viewing an amount of glow emanating from a termination area. In one embodiment, a splice component and the portion of the ferrule holder disposed between the splice component and the cam member are optically transmissive. The cam member has a first array of wells and a second array of wells for viewing the amount of glow before and after the field optical fiber is terminated. In another embodiment, the ferrule holder is opaque and has a view port, while the cam member has a first well having a first depth and a second well having a second depth.

18 Claims, 6 Drawing Sheets

SPLICE CONNECTOR FOR VERIFYING AN ACCEPTABLE SPLICE TERMINATION

BACKGROUND OF THE INVENTION

1. Field of the Invention

The present invention relates generally to fiber optic splice connectors, and more particularly, to a splice connector having a stub optical fiber and means for verifying an acceptable splice termination between a field optical fiber and the stub optical fiber.

2. Technical Background

Optical fibers are useful in a wide variety of applications, including the telecommunications industry in which optical fibers are employed for voice, data and video transmission. Due, at least in part, to the extremely wide bandwidth and the low noise operation provided by optical fibers, the variety of applications in which optical fibers are being used is continuing to increase. For example, optical fibers no longer serve merely as a medium for long distance signal transmission, but are being increasingly routed directly to the home or business, and in some instances, directly to a desk or other work location. With the ever increasing and varied use of optical fibers, apparatus and methods have been developed for coupling optical fibers to one another outside the controlled environment of a factory setting, commonly referred to as "field installation" or "in the field." For example, field installations are typically performed in a telephone central office, in an office building, and in various types of outside plant terminals. However, in order to efficiently couple the optical signals transmitted along the fibers, a fiber optic connector must not significantly attenuate, reflect or otherwise alter the optical signals. In addition, fiber optic connectors for coupling optical fibers must be relatively rugged and adapted to be connected and disconnected a number of times in order to accommodate changes in the optical transmission path that may occur over time.

Although fiber optic connectors can generally be most efficiently and reliably mounted upon the end portion of an optical fiber in a factory setting during the production of a fiber optic cable assembly, many fiber optic connectors must be mounted upon the end portion of an optical fiber in the field in order to minimize cable lengths and to optimize cable management and routing. As such, a number of fiber optic connectors have been developed specifically to facilitate field installation. One advantageous type of fiber optic connector designed specifically to facilitate field installation is the UNICAM® family of field-installable fiber optic connectors available from Corning Cable Systems LLC of Hickory, N.C. Although the UNICAM® family of field-installable connectors share a number of common features, including a common termination technique (i.e., mechanical splice), the UNICAM® family also offers several different styles of connectors, including mechanical splice connectors adapted to be mounted upon a single optical fiber and mechanical splice connectors adapted to be mounted upon two or more optical fibers. Regardless, each field-installable fiber optic connector requires a method of determining whether the continuity of the optical coupling between the fiber optic connector and a field optical fiber mounted to the fiber optic connector is acceptable. As used herein, this process is generally referred to as "verifying an acceptable splice termination." Typically, a splice termination is acceptable when a characteristic related to the optical performance of the connector, such as insertion loss or reflectance, is within a prescribed limit or threshold value.

A conventional field-installable fiber optic connector 10 is illustrated in FIGS. 1A and 1B. By way of example, the fiber optic connector 10 shown and described is a field-installable LC style UNICAM® mechanical splice connector developed by Corning Cable Systems LLC for interconnecting an optical fiber cable in the field to an optical connector, optical component or optical device. However, the concepts described herein are generally applicable to verifying the continuity of the optical coupling between any pair of interconnected optical fibers, and more particularly, between a field optical fiber and a stub optical fiber of any fiber optic splice connector, including a single fiber or multifiber fusion splice or mechanical splice connector. Examples of typical single fiber mechanical splice connectors are provided in U.S. Pat. Nos. 4,755,018; 4,923,274; 5,040,867; and 5,394,496. Examples of typical multifiber mechanical splice connectors are provided in U.S. Pat. Nos. 6,173,097; 6,379,054; 6,439,780; and 6,816,661. As shown herein, the mechanical splice connector 10 includes a ferrule 12 defining a lengthwise, longitudinal bore for receiving a stub optical fiber 14. The stub optical fiber 14 is preferably sized such that one end extends outwardly beyond the rear end 13 of the ferrule 12. The mechanical splice connector 10 also includes a pair of opposed splice components 17, 18, at least one of which defines a lengthwise, longitudinal groove for receiving and aligning the end portion of the stub optical fiber 14 and an end portion of a field optical fiber 15 of an optical cable upon which the connector 10 is to be mounted. As shown herein, the lower splice component 18 comprises a single lengthwise extending groove 19 for receiving and aligning the stub optical fiber 14 and the field optical fiber 15.

As shown, the mechanical splice connector 10 further includes a ferrule holder 16 for receiving the ferrule 12 and the splice components 17, 18. A cam member 20 is disposed about a medial portion of the ferrule holder 16 for engaging at least one of the splice components 17, 18, and to thereby secure the end portions of the stub optical fiber 14 and the field optical fiber 15 between the splice components, as will be described. In certain embodiments, the ferrule holder 16 has a view port 21 formed partially therethrough and located medially between the opposed ends of the ferrule holder for a purpose to be described hereinafter with reference to one of the preferred embodiments of the invention. A conventional lead-in 22 may be provided to guide the end portion of the field optical fiber 15 and an exposed length of a protective coating or buffer 25 into the rear of the ferrule holder 16. Furthermore, an optional crimp tube 24 may be disposed within the rear end of the lead-in 22 and employed to strain relieve the coating or buffer 25 of the fiber to the lead-in a known manner. The forward end of the ferrule holder 16 is disposed within a connector housing 26 and biased forwardly by a coil spring 28 retained inside the connector housing between the ferrule holder and a spring retainer 30. The outer jacket 35 of the optical cable and/or any strength elements 36 provided between the outer jacket and the buffer 25 may be positioned over the rear end of the ferrule holder 16 so that a conventional crimp band 32 may be employed in a known manner to strain relieve the optical cable to the connector 10. Finally, a flexible boot 34 may be positioned over the optical cable to prevent the optical cable from exceeding the minimum bend radius of the field optical fiber 15 immediately adjacent the rear of the connector 10. An optional trigger 38 having a flexible finger push 39 may be positioned over the cam member 20 with the finger push opposite a flexible latch 27 depending from the connector housing 26. If provided, the finger push 39 may be depressed to assist in moving the latch 27 to insert and remove the mechanical splice connector 10 from, for example, a dense optical patch panel. The fiber optic mechanical splice connector 10 is described in greater detail in co-pending U.S. patent application Ser. No. 10/808,057 filed on Mar. 24, 2004, and assigned to the assignee of the present invention.

In order to mount the mechanical splice connector 10 upon the field optical fiber 15, the splice components 17, 18 are positioned proximate the rear end 13 of the ferrule 12 with the end portion of the stub optical fiber 14 extending rearwardly from the ferrule disposed within the groove 19 defined by the splice components. Once the connector 10 is assembled as shown in FIG. 1B, the end portion of the field optical fiber 15 can be inserted into the rear end of the connector 10 and guided by the lead-in 22 and optional crimp tube 24 into the groove 19 defined by the splice components 17, 18. By advancing the field optical fiber 15 into the groove 19 defined by the splice components 17, 18, the end portion of the field optical fiber eventually makes physical contact with the end portion and the stub optical fiber 14 and establishes an optical connection, or coupling, between the stub optical fiber and the field optical fiber. The termination of the field optical fiber 15 to the fiber optic connector 10 is completed by actuating the cam member 20 to bias the splice components 17, 18 together, and thereby secure the end portions of the stub optical fiber 14 and the field optical fiber 15 within the groove 19 defined by the splice components. In the exemplary embodiments provided herein, the cam member 20 is actuated (also referred to "cammed" or "closed") by rotating the cam member about the ferrule holder 16 and relative to the splice components 17, 18. If the continuity of the optical coupling between the stub optical fiber 14 and the field optical fiber 15 is acceptable (e.g., the insertion loss is less than a prescribed value and/or the reflectance is greater than a prescribed value), the cable assembly can be completed. The cable assembly may be completed, for example, by crimping the rear end of the crimp tube 24 onto the buffer 25 and/or crimping the crimp band 32 onto the jacket 35 and/or strength members 36 positioned over the rear end of the ferrule holder 16. Finally, the flexible boot 34 previously positioned over the optical cable may be slid forward over the rear of the connector 10 and secured thereto using an adhesive, heat-shrink or other suitable means.

Installation tools have also been developed to facilitate the splice termination of an optical fiber to a fiber optic splice connector, and particularly, to terminate a field optical fiber to a mechanical splice connector. Examples of typical installation tools for facilitating the connectorization of one or more optical fibers to a mechanical splice connector in the field are described in U.S. Pat. Nos. 5,040,867; 5,261,020; 6,816,661; and 6,931,193. In particular, U.S. Pat. Nos. 6,816,661 and 6,931,193 describe a UNICAM® installation tool available from Corning Cable Systems LLC of Hickory, N.C. designed specifically to facilitate mounting the UNI-CAM® family of fiber optic connectors upon the end portions of one or more field optical fibers. In general, the installation tool supports the mechanical splice connector 10 (including the ferrule 12 and the splice components 17, 18) while the field optical fiber 15 is inserted into the connector and aligned with the stub optical fiber 14. In this regard, the installation tool includes a tool base, a tool housing positioned on the tool base, and an adapter provided on the tool housing. The adapter has a first end for engaging the mechanical splice connector 10 to be mounted upon the field optical fiber 15, and an opposed second end that serves as a temporary dust cap. The forward end of the mechanical splice connector 10 is received within the first end of the adapter, which in turn is mounted on the tool housing. The end portion of the field optical fiber 15 is then inserted into the open rear end of the mechanical splice connector 10 and the splice components 17, 18 are subsequently biased together, for example by engagement of the cam member 20 with a keel portion provided on at least one of the splice components, in order to secure the stub optical fiber 14 and the field optical fiber 15 between the splice components. In the particular example of the installation tool shown and described in U.S. Pat. Nos. 6,816,661 and 6,931,193, the cam member 20 is actuated by rotating a cam actuator arm provided on the tool housing about ninety degrees (90°) around the longitudinal axis of the mechanical splice connector 10 from a generally vertical position to a generally horizontal position. As the cam member 20 rotates, the radially inner surface of the generally cylindrical cam member engages the keel portion of the lower splice component 18 extending through a slot provided on the ferrule holder 16 to urge the lower splice component to move in the direction of the upper splice component 17.

Once the fiber optic connector 10 is mounted upon the end portion of the field optical fiber 15 (i.e., the field optical fiber is terminated to the connector), the resulting fiber optic cable assembly is typically tested end-to-end. Among other things, testing is conducted to determine whether the optical continuity established between the stub optical fiber 14 and the field optical fiber 15 is acceptable. While optical connections and fiber optic cables can be tested in many different manners, a widely accepted test involves the introduction of light having a predetermined intensity and/or wavelength into the stub optical fiber 14 or the field optical fiber 15. By measuring the light propagation through the fiber optic connector 10, and more particularly, by measuring the insertion loss and/or reflectance using an optical power meter or Optical Time Domain Reflectometer (OTDR), the continuity of the optical coupling between the stub optical fiber 14 and the field optical fiber 15 can be determined. If testing indicates that the optical fibers are not sufficiently coupled (for example the end portion of the field optical fiber 15 and the end portion of the stub optical fiber 14 are not in physical contact or are not aligned) the operator must either scrap the entire fiber optic cable assembly or, more commonly, replace the fiber optic connector 10 in an attempt to establish the desired optical continuity. In order to replace the fiber optic connector 10, the operator typically removes (i.e., cuts) the mechanical splice connector off of the field optical fiber 15 and discards the connector. The operator then repeats the splice termination process described above utilizing a new mechanical splice connector disposed on the installation tool and mounting the new mechanical splice connector onto a re-cleaved end portion of the field optical fiber. Field-installable mechanical splice connectors are known that permit the splice termination to be reversed, and thereby avoid the need to scrap the entire fiber optic cable assembly or the fiber optic connector. Regardless, significant time and expense is still required to mount the fiber optic connector onto the field optical fiber, remove the cable assembly from the installation tool, conduct the continuity test and, in the event of an unacceptable splice termination, repeat the entire process.

In order to facilitate relatively simple, rapid and inexpensive continuity testing, Corning Cable Systems LLC of Hickory, N.C. has developed installation tools for field-installable mechanical splice connectors that permit continuity testing while the connector remains disposed on the installation tool. As previously described, the installation tool includes an adapter having opposed first and second ends, the first end of which is adapted to receive the mechanical splice connector 10. In order to test the continuity of the optical coupling between the stub optical fiber 14 and the field optical fiber 15, an optical power generator, such as a laser diode, is provided to deliver a visible wavelength (e.g., red) laser light to the area within the splice connector 10 where the end portion of the stub optical fiber meets the end portion of the field optical fiber, referred to herein as the "splice joint," or alternatively, the "termination area." In a particular embodiment, the visible light is delivered through the stub optical fiber 14 to the termination area via a test optical fiber mounted upon a mating test connector received within the second end of the adapter. Alternatively, a laser diode may be positioned immediately adjacent the end face 11 of the ferrule 12 opposite the stub optical fiber 14. As a result, the termination area is illuminated with visible light that produces a "glow" indicative of the amount of light from the stub optical fiber 14 being coupled into the field optical fiber 15. At least a portion of the connector 10 is formed of a non-opaque, optically transmissive (e.g., translucent or transparent) material, for example the splice components 17, 18, the ferrule holder 16, and/or the cam member 20, so that the glow emanating from the termination area is visible to an operator.

By monitoring the dissipation of the glow emanating from the termination area (i.e., from the stub optical fiber 14) before the end portion of the field optical fiber 15 is in physical contact with the end portion of the stub optical fiber and after the field optical fiber is terminated to the fiber optic connector 10, the operator can determine whether there is sufficient physical contact and/or alignment between the field optical fiber 15 and the stub optical fiber. In particular, continuity of the optical coupling between the stub optical fiber 14 and the field optical fiber 15 is presumed to be established if the amount of glow visible before the end portion of the field optical fiber 15 is in physical contact with the end portion of the stub optical fiber 14 dissipates below a threshold amount when the field optical fiber is terminated to the connector 10. Once the end portion of the field optical fiber 15 is in physical contact with the end portion of the stub optical fiber 14, the cam member 20 of the fiber optic connector 10 can be actuated to fix the position of the field optical fiber 15 relative to the stub optical fiber 14 within the splice components 17, 18, and to thereby terminate the field optical fiber to the connector. In instances when the splice termination is unacceptable (i.e., the initial glow emanating from the termination area does not dissipate below the threshold amount), the field optical fiber 15 may be repositioned relative to the stub optical fiber 14 and again terminated to the fiber optic connector 10 until the splice termination is acceptable. As previously mentioned, the installation tool may permit the cam member 20 to be un-actuated (i.e., reversed) in the event that the splice termination is unacceptable, thereby releasing the splice components 17, 18, so that the field optical fiber 15 can be repositioned relative to the stub optical fiber 14 and again terminated to the fiber optic connector 10.

The Corning Cable Systems LLC method for verifying an acceptable splice termination described above is commonly referred to as the "Continuity Test System" (CTS) and the combined functionality of the visible light laser, test optical fiber and test connector are commonly referred to as a "Visual Fault Locator" (VFL). In practice, the method is generally sufficient for determining whether the majority of splice terminations are acceptable since the quality of the splice need not be maintained to a high degree of precision and the operator is typically highly-trained and experienced.

However, in certain circumstances, for example when a fiber optic network requires an exceptionally low insertion loss, it is important to maintain the quality of the splice termination to a greater degree of precision. At the same time, it is desirable to utilize less highly-trained and experienced operators in order to reduce the overall cost of installing a fiber optic network. In such situations, a potential shortcoming of the above-described CTS method using a VFL is the variability of the amount of glow emanating from the termination area before the field optical fiber 15 is positioned in physical contact with the stub optical fiber 14 and after the field optical fiber is terminated to the mechanical splice connector 10. In particular, it may be difficult even for a highly-trained and experienced operator to assess whether the change in the amount of glow emanating from the termination area before and after the field optical fiber 15 is terminated to the fiber optic connector 10 is substantial enough to indicate an acceptable splice termination. Variations in the ambient light, variations in the translucence of different fiber optic connectors, the operating condition of the VFL and the adapter, the subjectivity of the operator, and the variability introduced by different operators conducting the same test for different splice terminations are just some of the factors that contribute to the varying and inconsistent results that may be obtained when conducting continuity testing using a VFL.

Furthermore, depending upon the translucence of the fiber optic connector and the intensity of the visible laser light, the termination area may continue to glow appreciably (sometimes termed "nuisance glow") even after an acceptable splice termination. As a result, a less highly-trained or less experienced operator may attempt multiple insertions of the field optical fiber or repeated splice terminations using the same fiber optic connector in an effort to further diminish or entirely eliminate the nuisance glow in an acceptable splice termination. These misguided efforts of the untrained or inexperienced operator typically cause damage to the fiber optic connector or to the field optical fiber, or in the least, result in optical performance less than that which would have been achieved had the operator accepted the first termination, even though the glow was not completely diminished and the nuisance glow persisted. Contrary to the common understanding within the industry, it is the properly scaled difference in the amount of glow emanating from the termination area before and after the field optical fiber 15 is terminated rather than the residual amount of glow that is most critical in determining whether a particular splice termination is acceptable. Accordingly, improved apparatus and methods are needed to reduce the overall time and cost required to verify an acceptable splice termination. In particular, improved apparatus and methods are needed to reduce the subjectivity presently introduced by an operator when verifying an acceptable splice termination in a field-installable fiber optic connector, and to thereby correspondingly increase the efficiency and accuracy of determining whether a particular splice termination is acceptable. Preferably, such apparatus and methods should accommodate existing installation tools for field-installable fiber optic connectors, and more preferably, accommodate existing installation tools for single fiber and multifiber field-installable mechanical splice connectors.

Additional features and advantages of the invention are set forth in the detailed description which follows and will be readily apparent to those skilled in the art from that description, or will be readily recognized by practicing the invention as taught by the detailed description, the drawings and the appended claims. It is to be understood that both the foregoing general description and the following detailed description present exemplary embodiments of the invention as well as certain preferred embodiments. As such, the detailed description is intended to provide an overview or framework for understanding the nature and character of the invention as recited in the appended claims. The accompanying drawings are included to provide a further understanding of the invention, and are incorporated into and constitute a part of this specification. The drawings illustrate various preferred embodiments of the invention, and together with the detailed description, serve to explain the principles and operations thereof. However, the drawings and descriptions are intended to be merely illustrative, and therefore, should not be construed so as to limit the scope of the claims in any manner.

DETAILED DESCRIPTION OF THE PREFERRED EMBODIMENTS

Figure 1A:
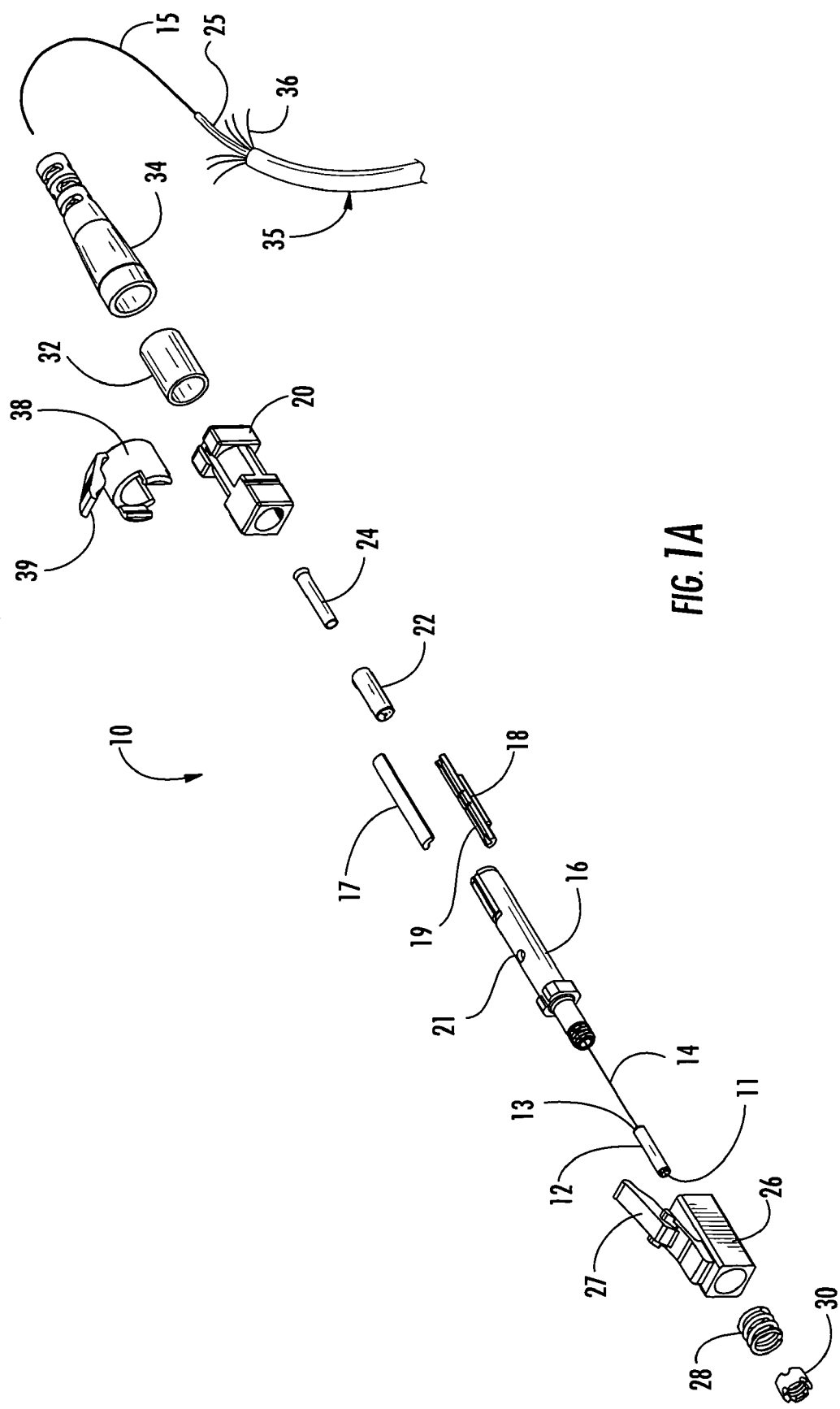
FIG. 1A is an exploded perspective view of a conventional field-installable mechanical splice connector configured to be mounted upon an end portion of a field optical fiber.

Reference will now be made in greater detail to various exemplary embodiments of the invention, preferred embodiments of which are illustrated in the accompanying drawings. Whenever possible, the same reference numerals will be used throughout the drawings to refer to the same or similar parts. A single fiber field-installable mechanical splice connector operable for terminating a field optical fiber to the connector is shown herein for use with the various embodiments of the invention merely for purposes of convenience. It should be understood, however, that the splice connector and associated methods for verifying an acceptable splice termination disclosed herein may be applied to any optical coupling between any number of optical fibers, such as, but not limited to, any splice termination between adjoining optical fibers wherein visible light energy can be transmitted along at least one of the optical fibers and the light energy in the immediate vicinity of the splice joint can be detected. Accordingly, the invention should not be construed as being limited in any manner by the example of a single fiber field-installable mechanical splice connector shown and described herein.

Referring now once again to FIGS. 1A and 1B in which an exploded perspective view and a lengthwise cross-sectional view of a conventional single fiber field-installable mechanical splice connector 10 is shown. The splice connector 10 comprises a ferrule 12 defining a lengthwise bore therethrough for receiving and securing a stub optical fiber 14 in a known manner, such as by an adhesive. The forward end (also referred to herein as the end face) 11 of the ferrule is typically precision polished such that the stub optical fiber 14 is flush with (as shown) or slightly protruding from the end face of the ferrule. However, the stub optical fiber 14 may also protrude outwardly from the end face 11 of the ferrule 12 a predetermined distance, if desired. Furthermore, the end face 11 may be oriented generally perpendicular to the bore to provide an Ultra Physical Contact (UPC) type connector, or may be formed at a predetermined angle to provide an Angled Physical Contact (APC) type connector, in a know manner. In addition, although a single fiber ferrule 12 is shown for purposes of convenience, the ferrule may define a plurality of lengthwise bores therethrough for receiving a corresponding plurality of stub optical fibers to provide a multifiber mechanical splice connector. Regardless, the rear end 13 of the ferrule 12 is received within and secured to the forward end of a ferrule holder 16 so that the stub optical fiber 14 extends rearwardly a predetermined distance between a pair of opposed splice components 17, 18 disposed within the ferrule holder. In turn, the ferrule holder 16, including the ferrule 12 and splice components 17, 18, are disposed within a connector housing 26. A cam member 20 is movably mounted between the ferrule holder 16 and the connector housing 26 for engaging a keel portion of the lower splice component 18, as will be described. If desired, the ferrule 12, the ferrule holder 16 and the splice components 17, 18 may be biased relative to the connector housing 26, for example by a coil spring 28, to ensure physical contact between the end face 11 of the ferrule 12 and the end face of an opposing ferrule in a mating fiber optic connector or optical device. Finally, a spring retainer 30 may be threaded onto the forward end of the ferrule holder 26 to retain the coil spring 28 between the spring retainer and an inwardly projecting shoulder of the connector housing 26 that fixes one end of the coil spring relative to the connector housing. As a result, the ferrule 12, the ferrule holder 16 and the splice components 17, 18 are biased forwardly, yet permitted to piston rearwardly relative to the connector housing 26.

Figure 1B:
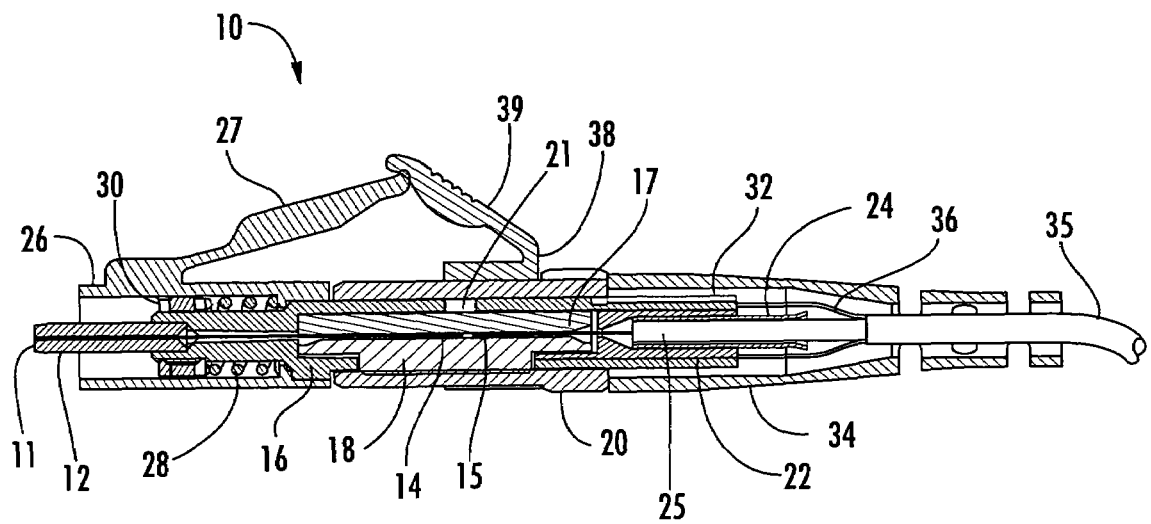
FIG. 1B is a lengthwise cross-sectional view of the mechanical splice connector and the field optical fiber of FIG. 1A shown assembled with the end portions of the stub optical fiber and the field optical fiber positioned within the splice components and the cam member in the actuated position to secure the end portions of the optical fibers between the splice components.

As shown in FIG. 1B, a field optical fiber 15 is inserted into the rear end of the ferrule holder 16 opposite the ferrule 12 and the stub optical fiber 14 through a lead-in tube 22 and a crimp tube 24 in a conventional manner. The lead-in tube 22 and the crimp tube 24 guide the field optical fiber 15 into the ferrule holder 16 and between the splice components 17, 18 so that the end portion of the field optical fiber is in general alignment with the stub optical fiber 14. Preferably, at least one of the splice components 17, 18 has a groove formed therein for receiving the stub optical fiber 14 and the field optical fiber 15. As shown herein, the lower splice component 18 is provided with a lengthwise extending V-shaped groove 19 (FIG. 1A) for receiving and guiding the stub optical fiber 14 and the field optical fiber 15 into fine alignment. Typically, the field optical fiber 15 is coated or tight-buffered with a buffer 25 that is stripped back to expose a predetermined length of the end of the field optical fiber. A forward portion of the buffer may be disposed within the crimp tube 24 and the crimp tube thereafter "crimped" (i.e., deformed radially inward) to retain and strain relieve the buffer 25 of the field optical fiber 15 to the ferrule holder 16. With the buffer 25 stripped back, the field optical fiber 15 can be advanced into the rear of the mechanical splice connector 10 between the splice components 17, 18 until the end portion of the field optical fiber makes physical contact with the end portion of the stub optical fiber 14. The cam member 20 can then be actuated, for example by rotating the cam member relative to the ferrule holder 16 about the longitudinal axis of the connector 10. Actuating the cam member 20 (also referred to as "camming") cause the radially inner surface of the cam member to engage the keel portion of the lower splice component 18 and thereby urge the lower splice component to move in the direction of the upper splice component 17 into the position shown in FIG. 1B. Movement of the lower splice component 18 causes the end portion of the stub optical fiber 14 and the end portion of the field optical fiber 15 to seat within the V-shaped groove 19 formed in the lower splice component 18, thereby aligning and simultaneously securing the field optical fiber 15 and the stub optical fiber 14 between the splice components.

In the event that the field optical fiber 15 is not in physical contact or is not properly aligned with the stub optical fiber 14, significant attenuation and/or reflectance of the optical signal transmitted along the optical fibers may occur. A slight amount of attenuation and/or reflectance is inevitable at any optical coupling due to the fact that the cores of the optical fibers are not truly concentric and the joint between the optical fibers cannot be formed with the same precision as a continuous optical fiber. Accordingly, the continuity of the optical coupling between the field optical fiber 15 and the stub optical fiber 14 is acceptable when a characteristic related to the optical performance of the connector, such as insertion loss or reflectance, is within a prescribed limit or threshold value. In a particular example, the continuity of the optical coupling is sufficient, and therefore the splice termination is acceptable, when the insertion loss at the mechanical splice joint is less than a prescribed value and the reflectance at the mechanical splice joint is greater than a prescribed value. As previously described, an indication of the insertion loss at the mechanical splice joint can be observed using the Continuity Test System (CTS) developed by Corning Cable Systems LLC, including an optical power generator or radiant energy source incorporated into a Visual Fault Locator (VFL) comprising, for example, a laser diode that propagates visible light energy along the stub optical fiber or the field optical fiber to the mechanical splice joint. The location of the mechanical splice joint corresponds to the area within the fiber optic connector 10 where the end portion of the stub optical fiber 14 meets the end portion of the field optical fiber 15, and is also referred to herein as the "termination area."

In a particular example, the VFL delivers visible light energy through a test optical fiber and the stub optical fiber 14 to the termination area via a mating test connector mounted upon the test optical fiber. The test connector is received within the second end of an adapter mounted on an installation tool for receiving the forward end of the mechanical splice connector 10. The VFL launches the visible light energy into the stub optical fiber 14 in the preferred embodiments of the mechanical splice connector 10 shown herein, thereby causing the mechanical splice joint to "glow" so that the amount of glow emanating from the termination area can be detected by an operator. In the particular example, the VFL generates an optical signal (e.g., a visible laser light) and transmits the visible light energy through a relatively short test optical fiber optically coupled to the VFL and factory-terminated with a precision polished test connector. The polished end face of the test connector is optically coupled to the polished end face of the mechanical splice connector 10 via the adapter mounted on the installation tool. Alternatively, the VFL may include a laser diode that directly couples the visible light energy in the stub optical fiber 14, for example through the adapter. In either case, the VFL and its components may be separate from the installation tool, or may be incorporated therein to provide a combined termination and continuity testing tool for a single fiber or multifiber field-installable connector. Regardless, with the end portion of the field optical fiber 15 spaced apart sufficiently from the end portion of the stub optical fiber 14, the light energy introduced into the stub optical fiber generates an enhanced glow that emanates from the stub optical fiber within the splice components 17, 18. The intensity of the glow at the termination area diminishes when the end portion of the field optical fiber 15 is brought into physical contact and optically coupled with the end portion of the stub optical fiber 14 (either through direct physical contact or via an index matching gel disposed within the splice components 17, 18) because the majority of the light energy transmitted through the stub optical fiber is coupled into the field optical fiber. Light energy that is not transmitted along the field optical fiber 15 results in a residual glow that is significantly less than the enhanced glow present when the end portion of the field optical fiber is spaced apart from the end portion of the stub optical fiber 14.

In the preferred embodiments shown and described herein, the mechanical splice connector 10 is a UNICAM® LC style field-installable connector of the type available from Corning Cable Systems LLC of Hickory, N.C. The light energy is introduced into the termination area of the mechanical splice connector 10 from the VFL through the stub optical fiber 14, and the light energy from the VFL 40 is a visible wavelength light. However, the broad concept of the present invention may likewise be satisfied by a CTS including a VFL that propagates light energy having any wavelength, including invisible wavelength light energy. When utilizing light energy having an invisible wavelength, the light energy is collected at the termination area in the form of optical power and provided to an opto-electronic circuit having means for converting the optical power to an electrical power that is delivered to a feedback monitor defining a display indicative of the amount of light energy emanating from the termination area. Such an electronic gauge and associated methods for verifying an acceptable splice termination are shown and disclosed in the co-pending U.S. patent application Ser. No. 11/304,313 filed on Dec. 15, 2005, and assigned to the assignee of the present invention. The exemplary embodiments of the splice connector of the present invention utilize a conventional CTS including a VFL, and therefore, still rely on an operator to observe the amount of visible wavelength light (i.e., glow) emanating from the termination area. However, the results obtained using a conventional CTS are subject to considerably less variability and inconsistency because splice connectors according to the present invention employ structural means, as will be described, that significantly reduce the subjectivity of the operator interpreting the amount of glow emanating from the termination area. In particular, splice connectors according to the present invention reduce the uncertainty of determining whether a splice termination is acceptable that typically results from the nuisance glow by concentrating the diffuse glow produced by the CTS at the termination area into one or more discrete locations. In a preferred embodiment shown and described herein, the number of discrete locations illuminated corresponds to the amount of light energy emanating from the termination area (i.e., the splice glow), and therefore indicates the quality of the splice termination. The fewer the number of discrete locations that are illuminated, the less the amount of splice glow at the termination area and therefore the higher the quality of the splice termination. In another preferred embodiment shown and described herein, the intensity of the illumination at a discrete location corresponds to the amount of splice glow, and therefore indicates the quality of the splice termination. The lower the intensity of the illumination, the less the amount of splice glow at the termination area and therefore the higher the quality of the splice termination.

Figure 2:
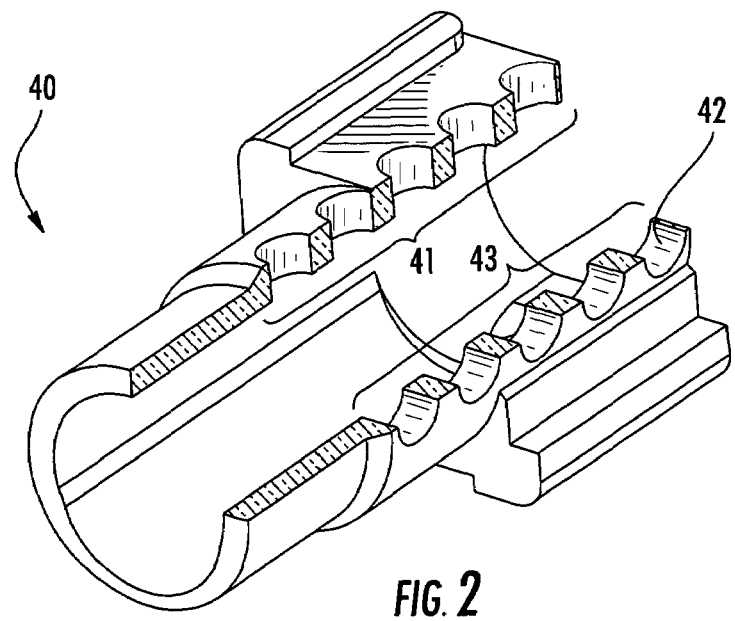
FIG. 2 is an enlarged perspective view of a cam member of a preferred embodiment of a mechanical splice connector for verifying an acceptable splice termination according to the invention shown with a portion of the cam member removed for purposes of clarity.
Figure 3A:
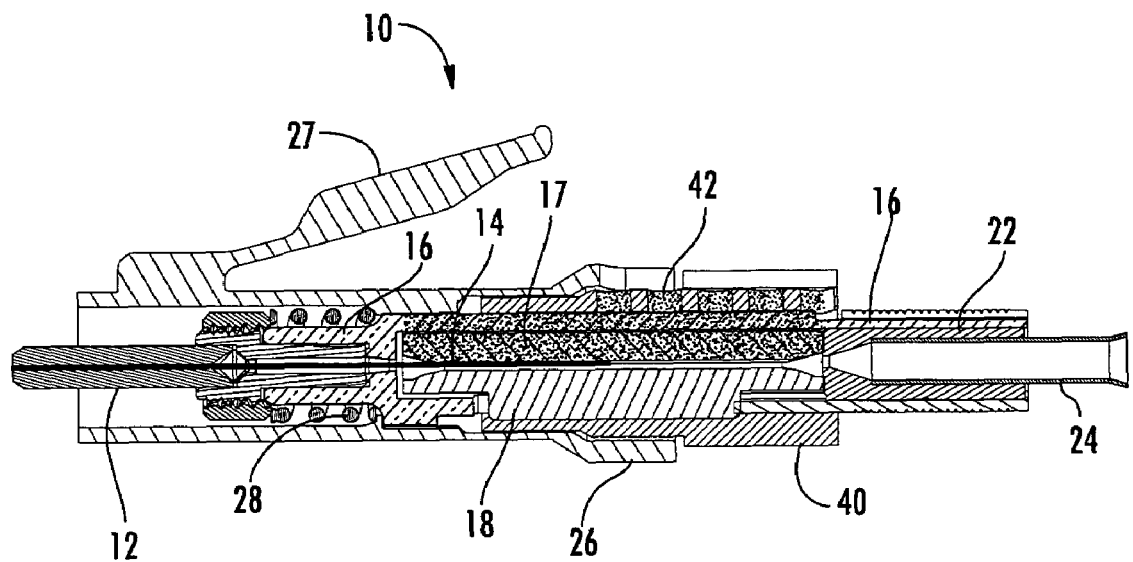
FIG. 3A is a lengthwise cross-sectional view of a preferred embodiment of a mechanical splice connector for verifying an acceptable splice termination according to the invention shown with the cam member of FIG. 2 in the un-actuated (i.e., opened) position.
Figure 3B:
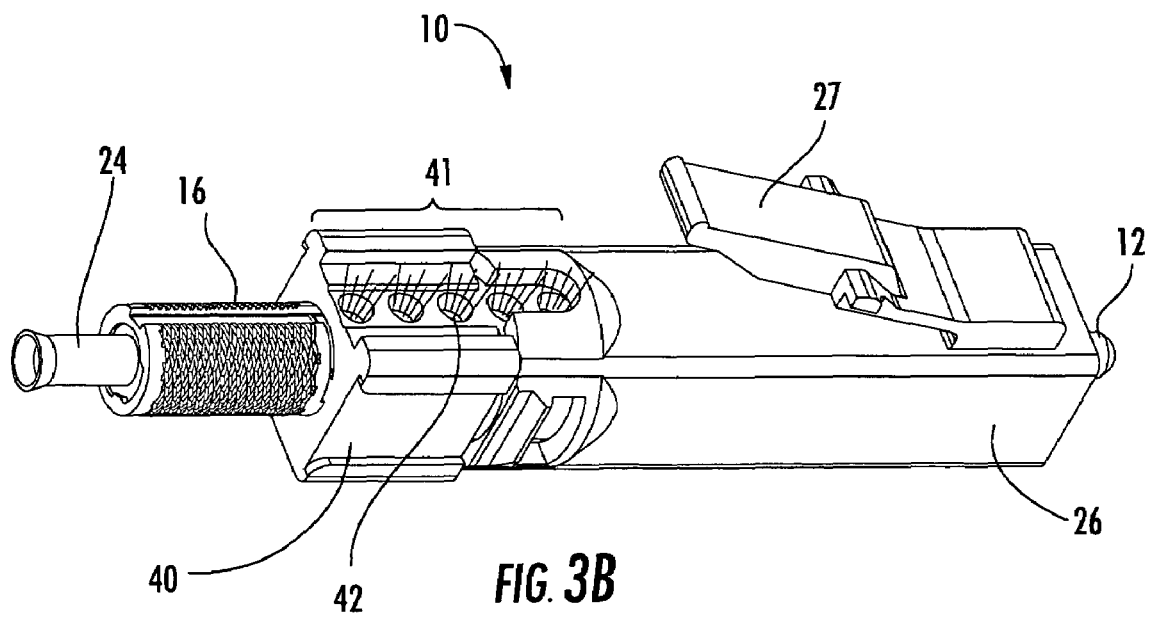
FIG. 3B is a perspective view of the mechanical splice connector of FIG. 3A shown with the cam member of FIG. 2 in the un-actuated (i.e., opened) position.
Figure 4A:
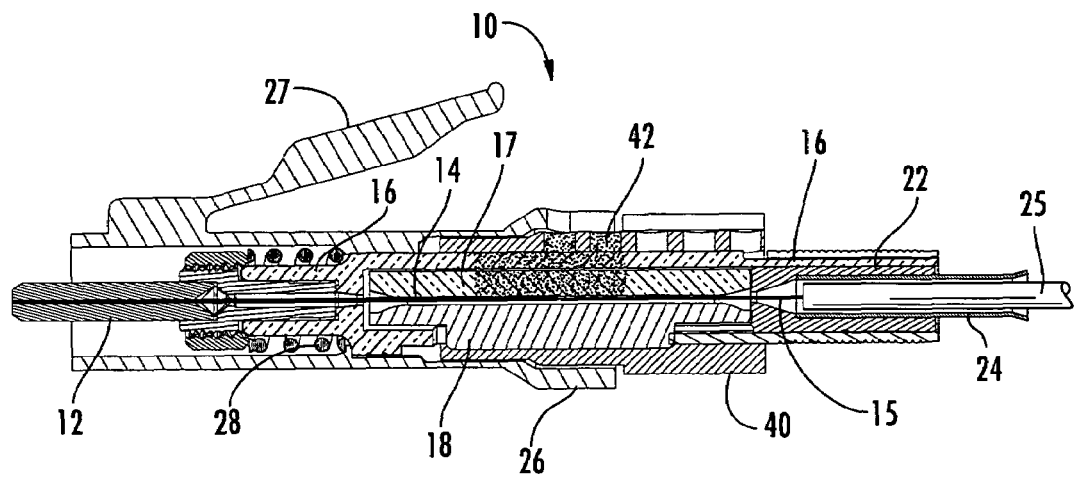
FIG. 4A is a lengthwise cross-sectional view of the mechanical splice connector of FIG. 3A shown with the cam member of FIG. 2 in the actuated (i.e., closed) position.
Figure 4B:
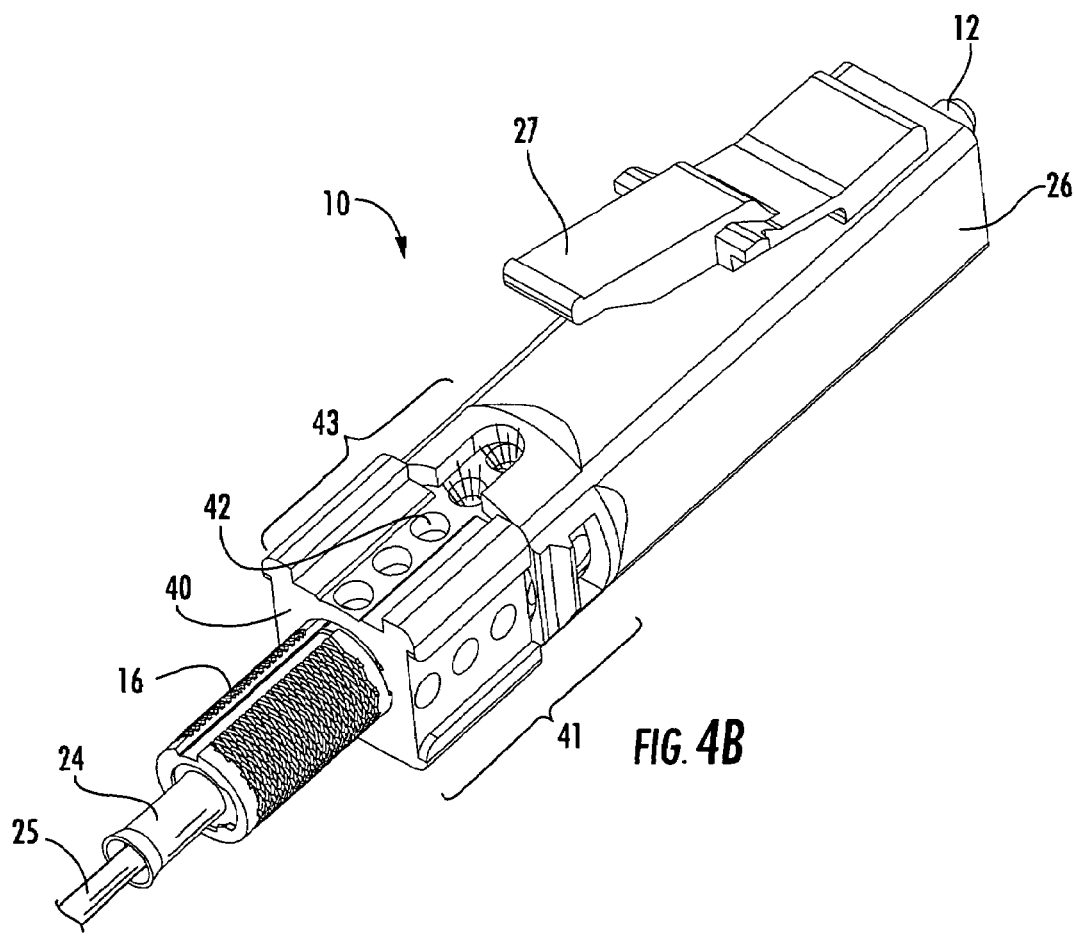
FIG. 4B is a perspective view of the mechanical splice connector of FIG. 3A shown with the cam member of FIG. 2 in the actuated (i.e., closed) position.

FIGS. 2, 3A, 3B, 4A and 4B illustrate a preferred embodiment of a mechanical splice connector 10 according to the invention. In particular, FIG. 2 is an enlarged perspective view of a modified cam member 40 for use with the connector 10. FIG. 3A is a lengthwise cross-sectional view of the mechanical splice connector 10 including the modified cam member 40 shown in the un-actuated (also referred to as the "un-cammed" or "opened") position and FIG. 3B is a perspective view of the connector 10 and cam member 40 shown in the un-actuated position. FIGS. 4A and 4B are corresponding cross-sectional and perspective views of the connector 10 and cam member 40 in the actuated (also referred to as the "cammed," "closed" or "terminated") position. The remainder of the connector 10 is essentially as previously described with the addition that the upper splice component 17 and at least a portion of the ferrule holder 16 are each made of a non-opaque, optically transmissive (i.e., translucent or transparent) material. Preferably, the upper splice component 17 and a portion of the ferrule holder 16 are made of a translucent material so that any splice glow passing therethrough is at least partially diffused, and therefore has the potential to be detected along the length of the cam member 40. Alternatively, the upper splice component 17 and/or a portion of the ferrule holder between the upper splice component and the cam member 40 may have a slot, channel or other elongate opening for permitting the splice glow to be observed from the exterior of the connector 10. The cam member 40 has a plurality of openings, or wells, 42 formed therein to assist the operator in observing the amount of glow emanating from the termination area that is transmitted to the exterior of the connector 10. The wells 42 may be through holes, or may be blind holes (i.e., extending only partially through the thickness of the cam member 40) formed from either the inside surface or the outside surface of the cam member. In addition, the depth of the blind wells 42 may vary to assist in blocking nuisance glow. The plurality of discrete wells 42 may have any suitable size or shape, and alternatively, may define a segregated or continuous channel or slot without departing from the intended broad scope of the invention. Regardless, the plurality of wells 42 are preferably arranged in a pair of generally linear arrays each extending lengthwise along the cam member 40 and comprising at least two, and preferably three or more, wells. As shown herein, the cam member 40 comprises two linearly aligned arrays 41, 43 each having five wells 42 that extend lengthwise along the cam member about ninety (90) degrees apart relative to the longitudinal axis of the connector 10. However, the linear arrays 41, 43 may be located elsewhere on the cam member 40 or the connector housing 26, and may be separated by any angular distance as long as a first linear array 41 of the wells 42 is illuminated and visible to an operator from an exterior surface of the cam member 40 when the cam member is in the un-actuated position and a second linear array 43 of the wells 42 is illuminated and visible to the operator when the cam member is in the actuated position. In this manner, the first linear array 41 is illuminated and visible to the operator when the field optical fiber 15 is not terminated to the mechanical splice connector 10 and the second linear array 43 is illuminated and visible to the operator when the field optical fiber is terminated to the connector.

The perspective view of FIG. 3B illustrates the exterior of the mechanical splice connector 10 as it appears to the operator with the cam member 40 in the un-actuated position such that the field optical fiber 15 is not yet terminated to the connector. Preferably, the field optical fiber 15 is not yet inserted into the rear of the ferrule holder 16 so that none of the visible light energy propagated by the VFL and emanating from the end portion of the stub optical fiber 14 is coupled into the field optical fiber. As a result, the glow emanating from the stub optical fiber 14 at the termination area is significantly enhanced, as illustrated in FIG. 3B by the enhanced light pattern depicted within the wells 42 of the linear array 41. Because the upper splice component 17 and at least the portion of the ferrule holder 16 between the upper splice component and the cam member 40 are translucent, the enhanced glow emanating from the termination area is transmitted through the upper splice component and the ferrule holder to the cam member 40 and illuminates the wells 42 of linear array 41. As a result, the splice glow is visible to the operator through a majority of the wells 42 of the linear array 41. As indicated by the shading in FIGS. 3A and 3B, the enhanced glow emanating from the termination area illuminates all five of the wells 42 of the linear array 41 of the cam member 40. The field optical fiber 15 may alternatively be at least partially inserted into the rear end of the ferrule holder 16 to ensure that the visible laser light from the VFL does not propagate uninterrupted through the mechanical splice connector 10 and beyond the termination area in the event that the VFL is inadvertently activated before the field optical fiber 15 is inserted. However, it should be noted that the visible laser light emanating from the stub optical fiber 14 is a relatively low intensity light, and in any event, will be essentially entirely dispersed within the termination area. Furthermore, inserting the field optical fiber 15 partially into the ferrule holder 16 may have the deleterious effect of diminishing the amount of splice glow visible to the operator through the wells 42 of the cam member 40 in the un-actuated position.

As previously mentioned, FIG. 4A is a lengthwise cross-sectional view and FIG. 4B is a perspective view of the mechanical splice connector 10 shown with cam member 40 in the actuated position such that the field optical fiber 15 is terminated to the connector. The end portion of the field optical fiber 15 is inserted and advanced (or merely advanced if the field optical fiber is already partially inserted into the connector 10) into physical contact with the end portion of the stub optical fiber 14. The cam member 40 is then rotated about ninety (90) degrees around the longitudinal axis of the connector 10 relative to the ferrule holder 16 so that the field optical fiber is terminated to the connector (compare FIG. 3B and FIG. 4B). Accordingly, a substantial amount of the visible light energy propagated by the VFL and emanating from the end portion of the stub optical fiber 14 is coupled into the field optical fiber 15. As a result, the glow emanating from the stub optical fiber 14 at the termination area is significantly diminished relative to the enhanced glow when the field optical fiber 15 is not in physical contact with the stub optical fiber, as illustrated in FIG. 4B by the diminished light pattern depicted within the wells 42 of the linear array 43. Because the upper splice component 17 and at least the portion of the ferrule holder 16 between the upper splice component and the cam member 40 are translucent, the diminished glow emanating from the termination area illuminates only a portion of the wells 42 of the linear array 43 of the cam member. As indicated by the shading in FIGS. 4A and 4B, the diminished glow illuminates, and therefore is visible to the operator, through only two of the wells 42 of the linear array 43 of the cam member 40. In the preferred embodiment shown and described in FIGS. 2, 3A, 3B, 4A and 4B, the wells 42 (in combination with the translucent nature of the upper splice component 17 and the ferrule holder 16) provide a passive structural means for gauging the amount of light energy emanating from the termination area, and in particular the splice glow from the mechanical splice joint, of a fiber optic connector. The splice glow is concentrated into the wells 42 and observed by the operator. The operator then uses the difference between the number of wells 42 of the linear array 41 illuminated by the enhanced glow and the number of wells 42 of the linear array 43 illuminated by the diminished glow to determine whether the splice termination is acceptable. In this manner, the subjective interpretation of the operator of the amount of glow emanating from the termination area before and after the field optical fiber 15 is terminated to the connector 10 is essentially eliminated. Instead of visually differentiating between the amount of enhanced glow and the amount of diminished glow, the operator need merely differentiate between the number of wells 42 illuminated by the enhanced glow and the number of wells illuminated by the diminished glow.

Figure 5:
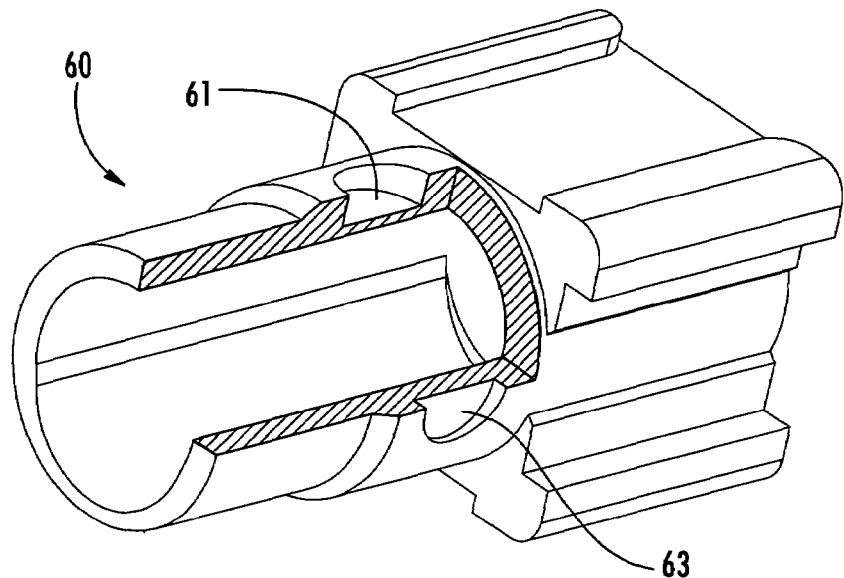
FIG. 5 is an enlarged perspective view of a cam member of another preferred embodiment of a mechanical splice connector for verifying an acceptable splice termination according to the invention shown with a portion of the cam member removed for purposes of clarity.
Figure 7:
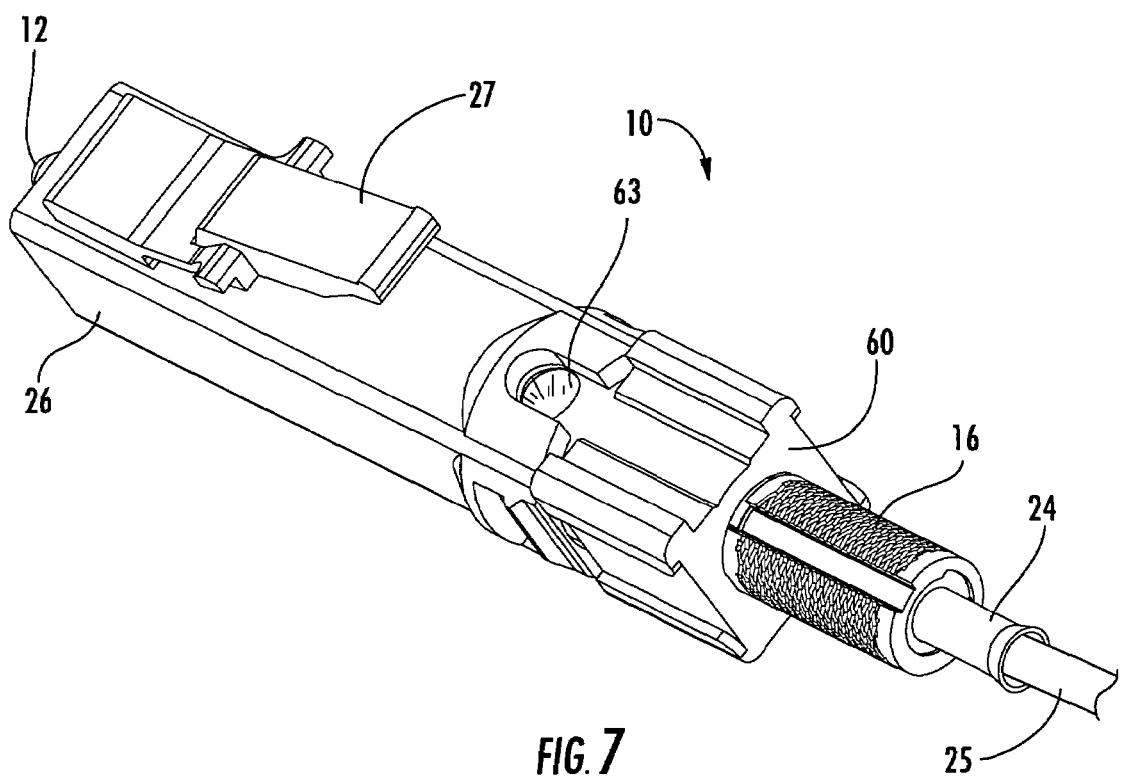
FIG. 7 is a perspective view of the mechanical splice connector of FIG. 6A shown with the cam member of FIG. 5 in the actuated (i.e., closed) position.
Figure 6A:
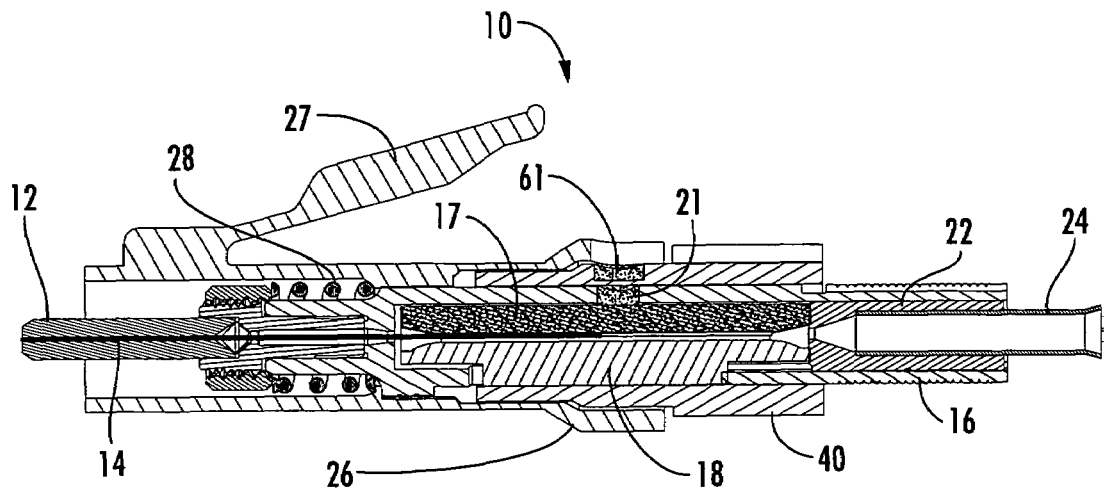
FIG. 6A is a lengthwise cross-sectional view of another preferred embodiment of a mechanical splice connector for verifying an acceptable splice termination according to the invention shown with the cam member of FIG. 5 in the un-actuated (i.e., opened) position.
Figure 6B:
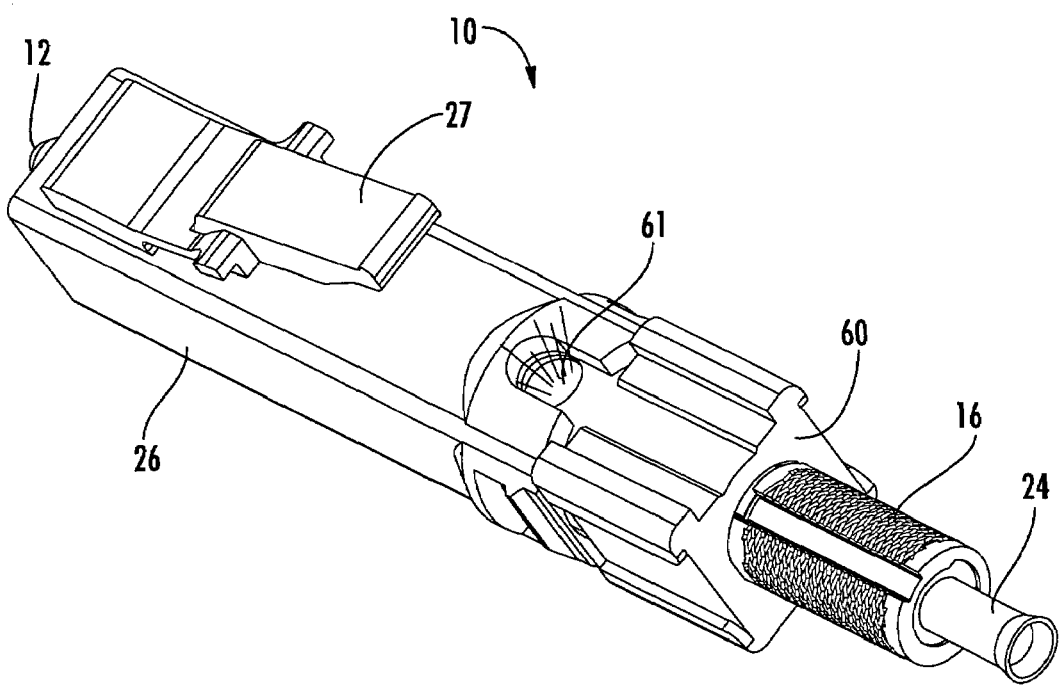
FIG. 6B is a perspective view of the mechanical splice connector of FIG. 6A shown with the cam member of FIG. 5 in the un-actuated (i.e., opened) position.

FIGS. 5, 6A, 6B and 7 illustrate another preferred embodiment of a mechanical splice connector 10 according to the invention. In particular, FIG. 5 is an enlarged perspective view of a modified cam member 60 for use with the connector 10. FIG. 6A is a lengthwise cross-sectional view of the mechanical splice connector 10 including the modified cam member 60 shown in the un-actuated (also referred to as the "un-cammed" or "opened") position and FIG. 6B is a perspective view of the connector 10 and cam member 60 shown in the un-actuated position. FIG. 7 is a corresponding perspective view of the connector 10 and cam member 60 in the actuated (also referred to as the "cammed," "closed" or "terminated") position. The remainder of the connector 10 is essentially as previously described with the addition that the upper splice. component 17 and the cam member 60 are each made of a non-opaque, optically transmissive (i.e., translucent or transparent) material. In contrast to the preferred embodiment previously described, the ferrule holder 16 is made of an opaque (i.e., non-translucent or non-transparent) material and has a view port 21 extending partially therethrough so that any splice glow from the termination area passing through the upper splice component 17 is concentrated into the view port. Therefore, the splice glow has the potential to be detected from the exterior of the connector 10 through the cam member 60. Furthermore, the cam member 60 has at least a pair of wells 61, 63 formed therein to assist the operator in observing the amount of glow emanating from the termination area that is transmitted to the exterior of the connector 10. The wells 61, 63 may be through holes, or may be blind holes (i.e., extending only partially through the thickness of the cam member 60) formed from either the inside surface or the outside surface of the cam member. Regardless, the wells 61, 63 are preferably arranged as a pair of single blind holes positioned medially on the exterior surface of the cam member 60 opposite the view port 21 of the ferrule holder 16 in the un-actuated and actuated positions. As shown herein, the cam member 60 comprises a well 61 and a well 63 having different depths formed on the exterior surface of the cam member about ninety (90) degrees apart relative to the longitudinal axis of the connector 10. However, any number of the wells 61, 63 having the same or different depth may be employed without departing from the intended broad scope of the invention. In addition, the wells 61, 63 may be separated by any angular distance as long as the well 61 is illuminated and visible to an operator on the exterior surface of the cam member 60 when the cam member is in the un-actuated position and the well 63 is illuminated and visible to the operator when the cam member is in the actuated position. In this manner, the first well 61 is illuminated and visible to the operator when the field optical fiber 15 is not terminated to the mechanical splice connector 10 and the second well 63 is illuminated and visible to the operator when the field optical fiber is terminated to the connector.

The perspective view of FIG. 6B illustrates the exterior of the mechanical splice connector 10 as it appears to the operator with the cam member 60 in the un-actuated position such that the field optical fiber 15 is not yet terminated to the connector. Preferably, the field optical fiber 15 is not yet inserted into the rear of the ferrule holder 16 so that none of the visible light energy propagated by the VFL and emanating from the end portion of the stub optical fiber 14 is coupled into the field optical fiber. As a result, the glow emanating from the stub optical fiber 14 at the termination area is significantly enhanced, as illustrated in FIG. 6B by the enhanced light pattern depicted within the well 61. Because the upper splice component 17 is translucent and the view port 21 is positioned between the upper splice component and the cam member 60, the enhanced glow emanating from the termination area is transmitted through the upper splice component and the view port into the well 61 of the cam member. As indicated by the shading in FIGS. 6A and 6B the enhanced glow emanating from the termination area illuminates the well 61 on the cam member 60 and, as a result, is visible to the operator through the well 61. Preferably, the depth of the well 61 is substantially the entire thickness of the wall of the cam member 60 and is significantly greater than the depth of the well 63 so that the enhanced glow appears exceptionally bright. The field optical fiber 15 may alternatively be at least partially inserted into the rear end of the ferrule holder 16 to ensure that the visible laser light from the VFL does not propagate uninterrupted through the mechanical splice connector 10 and beyond the termination area in the event that the VFL is inadvertently activated before the field optical fiber 15 is inserted. However, it should be noted that the visible laser light emanating from the stub optical fiber 14 is a relatively low intensity light, and in any event, will be essentially entirely dispersed within the termination area. Furthermore, inserting the field optical fiber 15 partially into the ferrule holder 16 may have the deleterious effect of diminishing the amount of splice glow visible to the operator through the well 61 of the cam member 60 in the un-actuated position.

As previously mentioned, FIG. 7 is a perspective view of the mechanical splice connector 10 shown with cam member 60 in the actuated position such that the field optical fiber 15 is terminated to the connector. The end portion of the field optical fiber 15 is inserted and advanced (or merely advanced if the field optical fiber is already partially inserted into the connector 10) into physical contact with the end portion of the stub optical fiber 14. The cam member 60 is then rotated about ninety (90) degrees around the longitudinal axis of the connector 10 relative to the ferrule holder 16 so that the field optical fiber is terminated to the connector (compare FIG. 6B and FIG. 7). Accordingly, a substantial amount of the visible light energy propagated by the VFL and emanating from the end portion of the stub optical fiber 14 is coupled into the field optical fiber 15. As a result, the glow emanating from the stub optical fiber 14 at the termination area is significantly diminished relative to the enhanced glow when the field optical fiber 15 is not in physical contact with the stub optical fiber, as illustrated in FIG. 7 by the diminished light pattern depicted within the well 63. Because the upper splice component 17 is translucent and the view port 21 is positioned between the upper splice component and the cam member 60, the diminished glow emanating from the termination area is transmitted through the upper splice component 17 and the view port 21 into the well 63 of the cam member. As indicated in FIG. 7, the enhanced glow emanating from the termination area illuminates the well 63 on the cam member 60 and, as a result, is visible to the operator through the well 63. Preferably, the depth of the well 63 is substantially less than the entire thickness of the wall of the cam member 60 and is significantly less than the depth of the well 63, thereby blocking any nuisance glow so that the diminished glow appears exceptionally dull or dark. In the preferred embodiment shown and described in FIGS. 5, 6A, 6B and 7, the wells 61, 63 (in conjunction with the translucent nature of the upper splice component 17 and the view port 21) provide a passive structural means for gauging the amount of light energy emanating from the termination area, and in particular the glow from the mechanical splice joint, of a fiber optic connector. The splice glow is concentrated into the wells 61, 63 and observed by the operator. The operator then uses the difference between the level of illumination visible in well 61 as a result of the enhanced glow and the level of illumination visible in well 63 as a result of the diminished glow to determine whether the splice termination is acceptable. In this manner, the subjective interpretation of the operator of the amount of glow emanating from the termination area before and after the field optical fiber 15 is terminated to the connector 10 is substantially reduced. As a result, a mechanical splice connector 10 configured with a cam member 60 according to the invention provides a more definitive indication for verifying an acceptable splice termination.

As will be immediately apparent to those of ordinary skill in the art, the size, shape and depth of the wells 61, 63, as well as the opacity of the material of the cam member 60, can be varied to provide a desired level of transmissivity. Alternatively, the cam member 60 may be made of an opaque (i.e., non-translucent or non-transparent) material and the wells 61, 63 may be through holes that are plugged with a material having the desired level of transmissivity. In this regard, it is possible to select a level of transmissivity having a threshold in the actuated position below which the nuisance splice glow does not penetrate the cam member 60 and therefore is not visible to the operator, but above which an unacceptable splice glow does penetrate the cam member and therefore is visible to the operator. Accordingly, a mechanical splice connector 10 including the cam member 60 would provide a "go" (i.e., dark) or "no-go" (i.e., illuminated) indication of an acceptable splice termination with the cam member in the actuated position. It is important to note that the wells 61, 63 (and the wells 42) do not act as a shutter in the un-actuated and actuated positions of the cam member that merely exposes or hides the splice glow. Instead, one of the novel aspects of the invention is that the transmissivity of the various components may be tuned such that in the actuated (i.e., "closed" or "terminated") position, the glow emanating from the termination area must exceed a predetermined minimum threshold in order to be visible to the operator and thereby indicate an unacceptable splice termination. On the other hand, if the splice glow from the termination area is not visible through the wells 42 of the linear array 43 or the well 63, the operator can verify an acceptable splice termination regardless of the nuisance glow that may be present. Thus, a splice connector according to the invention reduces the uncertainty, typically caused by the nuisance glow, of determining whether a splice termination is acceptable by permitting the splice glow to be visible to an operator only in the event it exceeds a predetermined threshold that is established through a combination of material transmissivity coupled with the wall thickness of the cam member 60. In this manner, the operator in most instances can rapidly, efficiently and accurately verify an acceptable splice termination without relying on a subjective interpretation of the difference in the amount of glow emanating from the termination area before and after the field optical fiber 15 is terminated to the connector.

The UNICAM® family of fiber optic mechanical splice connectors is ideal for applying the apparatus and methods of the present invention to visualize the splice glow at the mechanical splice joint between the stub optical fiber 14 and the field optical fiber 15, and thereby determine whether the splice termination is acceptable. The UNICAM® mechanical splice connector technology has unique design features that enable a rapid, accurate and cost effective verification of an acceptable splice termination during the termination process and prior to strain relieving the coating or the buffer material surrounding the field optical fiber 15. The means for determining an acceptable splice termination is used to visualize an initial (i.e., reference) splice glow and a final, or terminated, splice glow. An estimate of the insertion loss can be calculated based on a percentage of the final, or terminated, optical power to the initial (i.e., reference) optical power as described in co-pending U.S. patent application Ser. No. 11/193,931 filed on Jul. 29, 2005, and assigned to the assignee of the present invention. The apparatus and methods for determining an acceptable splice termination shown and described herein reduce UNICAM® scrap rates by further eliminating reliance on the subjectivity of an operator to determine visually whether there has been a sufficient reduction in the amount of "glow" emanating from the mechanical splice joint to verify acceptable optical continuity between the stub optical fiber 14 and the field optical fiber 15.

It will be apparent to those skilled in the art that innumerable modifications and variations can be made to the exemplary embodiments of the apparatus and methods of the invention shown and described herein without departing from the spirit and scope of the invention. Thus, it is intended that the present invention cover all conceivable modifications and variations of this invention, provided those alternative embodiments fall within the scope of the appended claims and their equivalents.

That which is claimed is:

1. A splice connector for verifying an acceptable splice termination between a stub optical fiber and a field optical fiber, the connector comprising:
    at least one splice component for receiving and aligning the stub optical fiber and the field optical fiber at a termination area;
    an actuator for engaging the splice component to perform a splice termination between the stub optical fiber and the field optical fiber; and
    viewing means for permitting an amount of glow emanating from the termination area to be viewed and for determining whether a splice termination between the stub optical fiber and the field optical fiber is acceptable without subjectively interpreting the amount of glow;
    wherein at least a portion of the at least one splice component is made of an optically transmissive material and wherein the actuator comprises a cam member having at least one well formed therein for permitting the glow emanating from the termination area to be viewed by the operator through the optically transmissive splice component; and
    wherein the cam member comprises at least a first array of wells for permitting the operator to view the amount of glow emanating from the termination area after the splice termination is performed.

2. The splice connector of claim 1 wherein the at least one splice component comprises a pair of opposed splice components and wherein the actuator comprises a cam member for engaging a portion of one of the pair of splice components to thereby move the one of the splice components in the direction of the other of the splice components.

3. The splice connector of claim 1 wherein the cam member comprises a second array of wells for permitting the operator to view the amount of glow emanating from the termination area before the splice termination is performed.

4. The splice connector of claim 3 wherein the first ray of wells and the second array of wells each comprise a generally linear ray of through holes extending along the length of the cam member and wherein the first array of wells and the second array of wells are spaced apart by a predetermined angular distance.

5. The splice connector of claim 1 wherein the cam member comprises a first well for permitting the operator to view the amount of glow emanating from the termination area before the splice termination is performed and a second well for permitting the operator to view the amount of glow emanating from the termination area after the splice termination is performed.

6. The splice connector of claim 5 wherein the first well is a blind hole having a first depth and the second well is a blind hole having a second depth different than the first depth.

7. The splice connector of claim 6 wherein the first depth is greater than the second depth.

8. The splice connector of claim 5 wherein the first well and the second well each comprise a single blind hole and wherein the first well and the second well are spaced apart by a predetermined angular distance.

9. A splice connector for verifying an acceptable splice termination comprising:
    a ferrule having a forward end, a rear end and a lengthwise bore;
    a stub optical fiber secured within the bore and extending rearwardly beyond the rear end of the ferrule;
    a pair of opposed splice components for receiving and aligning the stub optical fiber and a field optical fiber;
    an actuator for engaging at least one of the splice components to perform a splice termination between the stub optical fiber and the field optical fiber at a termination area within the splice connector;
    means for permitting an operator to view an amount of glow emanating from the termination area without the operator being required to subjectively interpret the amount of glow in order to verify an acceptable splice termination; and
    a ferrule holder for receiving the rear end of the ferrule, the stub optical fiber, the splice components and the field optical fiber therein and wherein at least a portion of one of the splice components is made of an optically transmissive material;
    wherein the actuator comprises a cam member and wherein the ferrule holder has a view port extending at least partially therethrough, the cam member having at least one well formed therein for permitting the glow emanating from the termination area to be viewed by the operator through the optically transmissive splice component and the view port of the ferrule holder.

10. The splice connector of claim 9 wherein the actuator comprises a cam member and wherein at least a portion of the ferrule holder disposed between the optically transmissive splice component and the cam member is likewise made of an optically transmissive material, the cam member having at least one well formed therein for permitting the glow emanating from to termination area to be viewed by the operator through the optically transmissive splice component and the optically transmissive portion of the ferrule holder.

11. The splice connector of claim 10 wherein the cam member comprises at least a first array of wells for permitting the operator to view the amount of glow emanating from the termination area after the splice termination is performed.

12. The splice connector of claim 11 wherein the cam member comprises a second array of wells for permitting the operator to view the amount of glow emanating from the termination area before the splice termination is performed.

13. The splice connector of claim 9 wherein the cam member comprises a first well for permitting the operator to view the amount of glow emanating from the termination area before the splice termination is performed and a second well for permitting the operator to view the amount of glow emanating from the termination area after the splice termination is performed.

14. The splice connector of claim 13 wherein the first well is a blind hole having a first depth and the second well is a blind hole having a second depth different than the first depth.

15. A method for verifying an acceptable splice termination comprising:

providing a splice connector comprising a stub optical fiber, at least one splice component, an actuator for engaging the splice component to perform a splice termination between the stub optical fiber and a field optical fiber at a termination area and viewing means for permitting an operator to view an amount of glow emanating from the termination area;

inserting the field optical fiber into the splice connector until an end portion of the field optical fiber makes physical contact with an end portion of the stub optical fiber at the termination area;

terminating the field optical fiber to the splice connector; and utilizing the viewing means to determine whether the splice termination is acceptable without subjectively interpreting the amount of glow at the termination area; and wherein at least a portion of the splice component is made of an optically transmissive material and wherein the viewing means comprises at least one well formed on the exterior of the splice connector for permitting the glow emanating from the termination area to be viewed by the operator through the optically transmissive splice component.

16. The method of claim 15 further comprising:

positioning the field optical fiber at a first position such the end portion of the field optical fiber is not in physical contact with the end portion of the stub optical fiber;

utilizing the viewing means to view the amount of glow emanating from the termination area with the field optical fiber at the first position;

positioning the field optical fiber at a second position such that the end portion of the field optical fiber is in physical contact with the stub optical fiber and the field optical fiber is terminated to the splice connector;

utilizing the viewing means to view the amount of glow emanating from the termination area with the field optical fiber at the second position; and observing whether the viewing means indicates that the amount of glow emanating from the termination area with the field optical fiber at the second position is within a predetermined threshold.

17. The method of claim 16 wherein the at least one well comprises a first array of wells for viewing the amount of glow emanating from the termination area before the splice termination is performed and a second array of wells for viewing the amount of glow emanating from the termination area after the splice termination is performed.

18. The method of claim 16 wherein the at least one well comprises a first well for viewing the amount of glow emanating from the termination area before the splice termination is performed and a second well for viewing the amount of glow emanating from the termination area after the splice termination is performed, and wherein the first well has a first depth and the second well has a second depth different than the first depth, and wherein the first well is spaced apart from the second well by a predetermined angular distance.

* * * * *